US008154491B2

(12) United States Patent
Ho et al.

(10) Patent No.: US 8,154,491 B2
(45) Date of Patent: Apr. 10, 2012

(54) OVERDRIVE METHOD FOR ANTI-DOUBLE EDGE OF LCD

(75) Inventors: Han-Jon Ho, Kaohsiung (TW); Chun-Chi Chen, Kaohsiung (TW)

(73) Assignee: VastView Technology Inc., Hsinchu (TW)

( * ) Notice: Subject to any disclaimer, the term of this patent is extended or adjusted under 35 U.S.C. 154(b) by 690 days.

(21) Appl. No.: 12/323,553

(22) Filed: Nov. 26, 2008

(65) Prior Publication Data

US 2009/0073159 A1 Mar. 19, 2009

Related U.S. Application Data

(63) Continuation-in-part of application No. 11/014,841, filed on Dec. 20, 2004, now abandoned.

(51) Int. Cl.
*G06F 3/038* (2006.01)

(52) U.S. Cl. ........................................................ 345/87

(58) Field of Classification Search ........................ None
See application file for complete search history.

(56) References Cited

U.S. PATENT DOCUMENTS

| | | | | |
|---|---|---|---|---|
| 6,043,829 | A * | 3/2000 | Inoue | 345/519 |
| 6,937,232 | B2 * | 8/2005 | Lin et al. | 345/204 |
| 7,148,869 | B2 * | 12/2006 | Chen et al. | 345/89 |
| 7,466,297 | B2 * | 12/2008 | Pai | 345/89 |
| 7,696,988 | B2 * | 4/2010 | Wu et al. | 345/204 |
| 7,768,506 | B2 * | 8/2010 | Tseng | 345/204 |
| 7,791,583 | B2 * | 9/2010 | Lin et al. | 345/101 |
| 7,812,802 | B2 * | 10/2010 | Lin et al. | 345/89 |
| 2005/0083353 | A1 * | 4/2005 | Maruyama et al. | 345/690 |

* cited by examiner

*Primary Examiner* — K. Wong
(74) *Attorney, Agent, or Firm* — Lowe Hauptman Ham & Berner LLP

(57) ABSTRACT

An overdrive method for anti-double edge of LCD uses: a register unit, a signal processing module including a selection unit and a driving-voltage lookup table (ADE LUT) and a plurality of multiplex processing units to effectively save the resources of hardware and to eliminate the double edge phenomenon generated during overdrive liquid-crystal image developing by selecting among present frame driving-voltage values, overdrive voltage values and actually achieved voltage values input from the driving-voltage lookup table and by outputting driving-voltage values suitable for respective situations according to selection signals of a selection unit by the multiplex processing units. The method is added with a complementary table and an operation unit to increase its scope of application, to eliminate double edge generated by different response speeds; and thereby is suitable for various liquid crystal displays.

6 Claims, 15 Drawing Sheets the value (code 120) of driving voltage of the present frame and the value (code 120) of driving voltage of the previous frame pass through the selection unit for outputting a selection signal, the selection signal represents that the positions of the value (code 120) of the driving voltage of the present frame and the value (code 120) of driving voltage of the previous frame are in the first area I; the value (code 120)of the driving voltage of the present frame and the value (code 120) of driving voltage of the previous frame pass through the driving-voltage contrast table and directly output the value (code 120) of the driving voltage of the present frame correspondingly

Figure 3A:
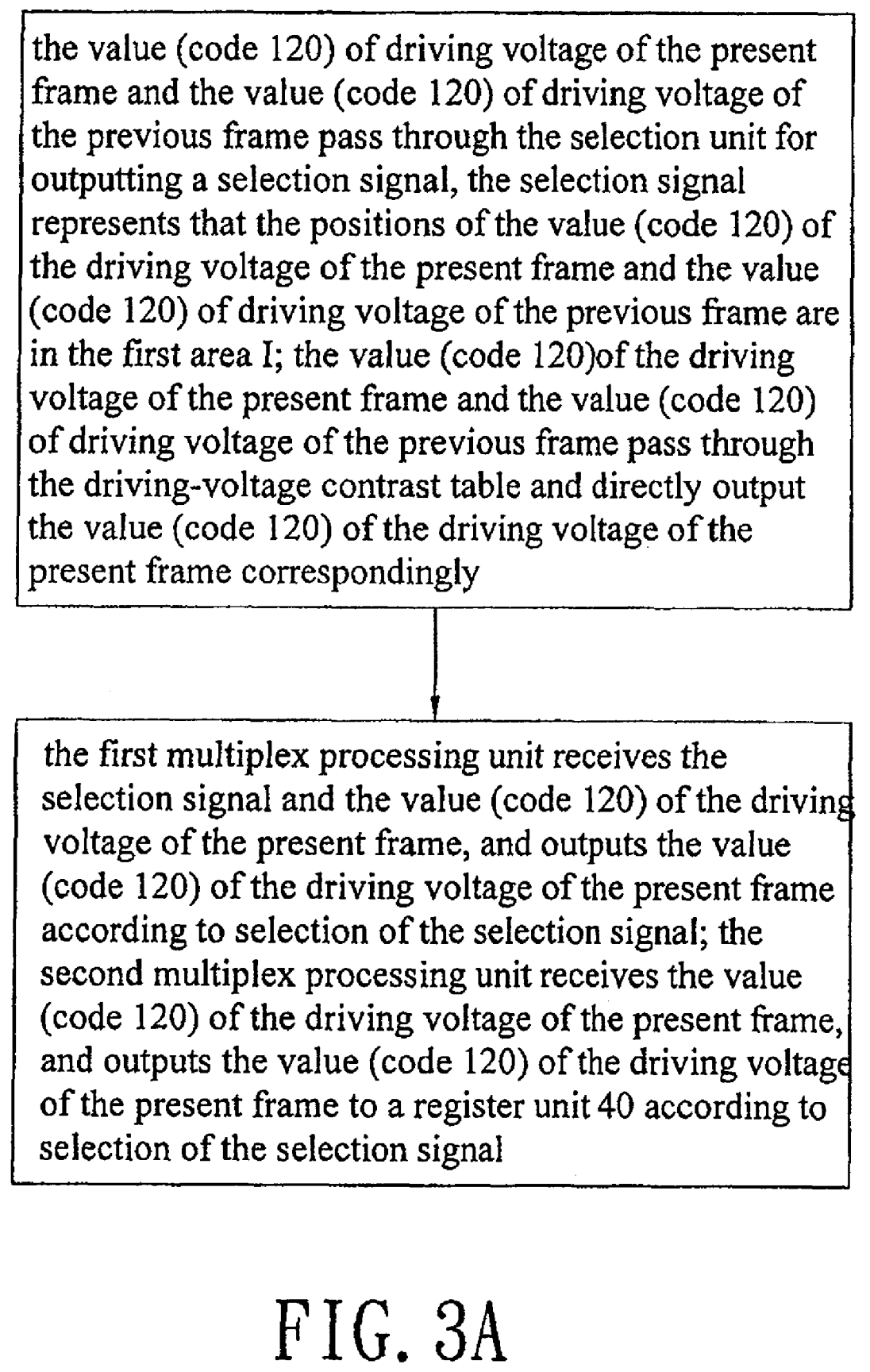

↓ the first multiplex processing unit receives the selection signal and the value (code 120) of the driving voltage of the present frame, and outputs the value (code 120) of the driving voltage of the present frame according to selection of the selection signal; the second multiplex processing unit receives the value (code 120) of the driving voltage of the present frame, and outputs the value (code 120) of the driving voltage of the present frame to a register unit 40 according to selection of the selection signal

FIG. 3A a value (code 20) of driving voltage of the present frame is input

Figure 3C:
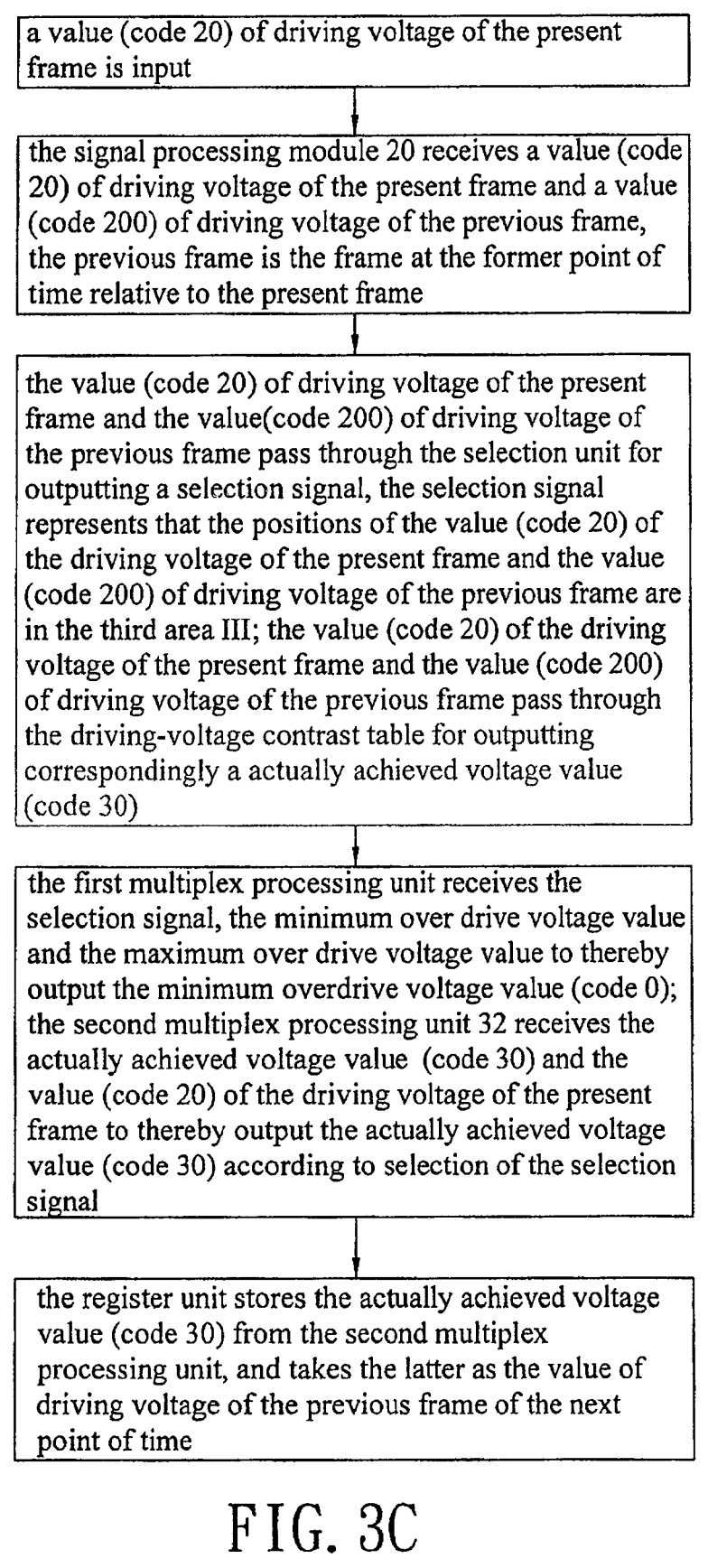

↓ the signal processing module 20 receives a value (code 20) of driving voltage of the present frame and a value (code 200) of driving voltage of the previous frame, the previous frame is the frame at the former point of time relative to the present frame

↓ the value (code 20) of driving voltage of the present frame and the value(code 200) of driving voltage of the previous frame pass through the selection unit for outputting a selection signal, the selection signal represents that the positions of the value (code 20) of the driving voltage of the present frame and the value (code 200) of driving voltage of the previous frame are in the third area III; the value (code 20) of the driving voltage of the present frame and the value (code 200) of driving voltage of the previous frame pass through the driving-voltage contrast table for outputting correspondingly a actually achieved voltage value (code 30)

↓ the first multiplex processing unit receives the selection signal, the minimum over drive voltage value and the maximum over drive voltage value to thereby output the minimum overdrive voltage value (code 0); the second multiplex processing unit 32 receives the actually achieved voltage value (code 30) and the value (code 20) of the driving voltage of the present frame to thereby output the actually achieved voltage value (code 30) according to selection of the selection signal

↓ the register unit stores the actually achieved voltage value (code 30) from the second multiplex processing unit, and takes the latter as the value of driving voltage of the previous frame of the next point of time

FIG. 3C the value (code 120) of driving voltage of the present frame and the value (code 120) of driving voltage of the previous frame pass through the selection unit for outputting a selection signal, the selection signal represents that the positions of the value (code 120) of the driving voltage of the present frame and the value (code 120) of driving voltage of the previous frame are in the first area I; the value (code 120) of the driving voltage of the present frame and the value (code 120) of driving voltage of the previous frame pass through the driving-voltage contrast table and directly output the value (code 120) of the driving voltage of the present frame of 6 bits

Figure 6A:
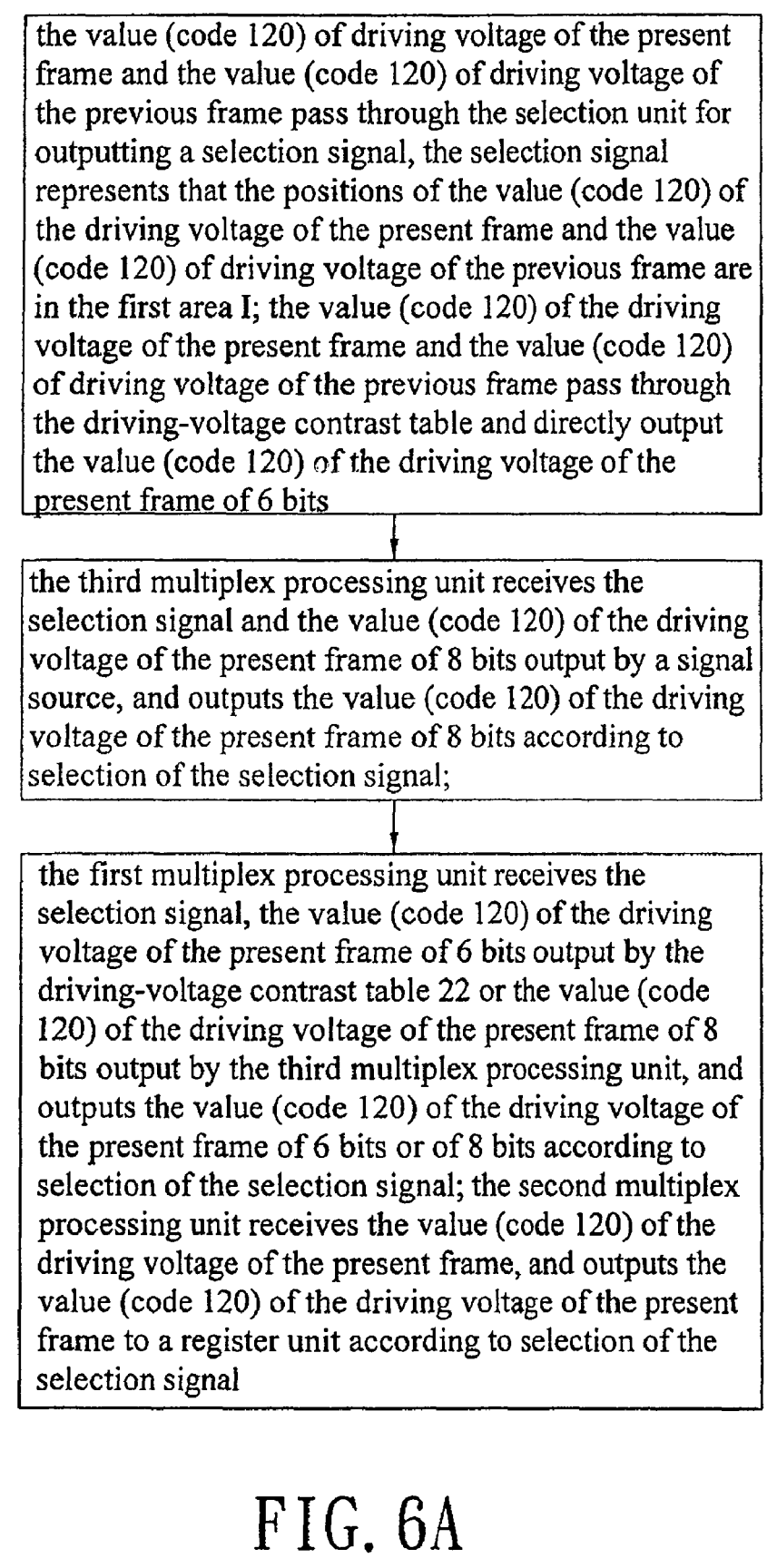

↓ the third multiplex processing unit receives the selection signal and the value (code 120) of the driving voltage of the present frame of 8 bits output by a signal source, and outputs the value (code 120) of the driving voltage of the present frame of 8 bits according to selection of the selection signal;

↓ the first multiplex processing unit receives the selection signal, the value (code 120) of the driving voltage of the present frame of 6 bits output by the driving-voltage contrast table 22 or the value (code 120) of the driving voltage of the present frame of 8 bits output by the third multiplex processing unit, and outputs the value (code 120) of the driving voltage of the present frame of 6 bits or of 8 bits according to selection of the selection signal; the second multiplex processing unit receives the value (code 120) of the driving voltage of the present frame, and outputs the value (code 120) of the driving voltage of the present frame to a register unit according to selection of the selection signal

FIG. 6A a value (code 30) of driving voltage of the present frame is input

Figure 6B:
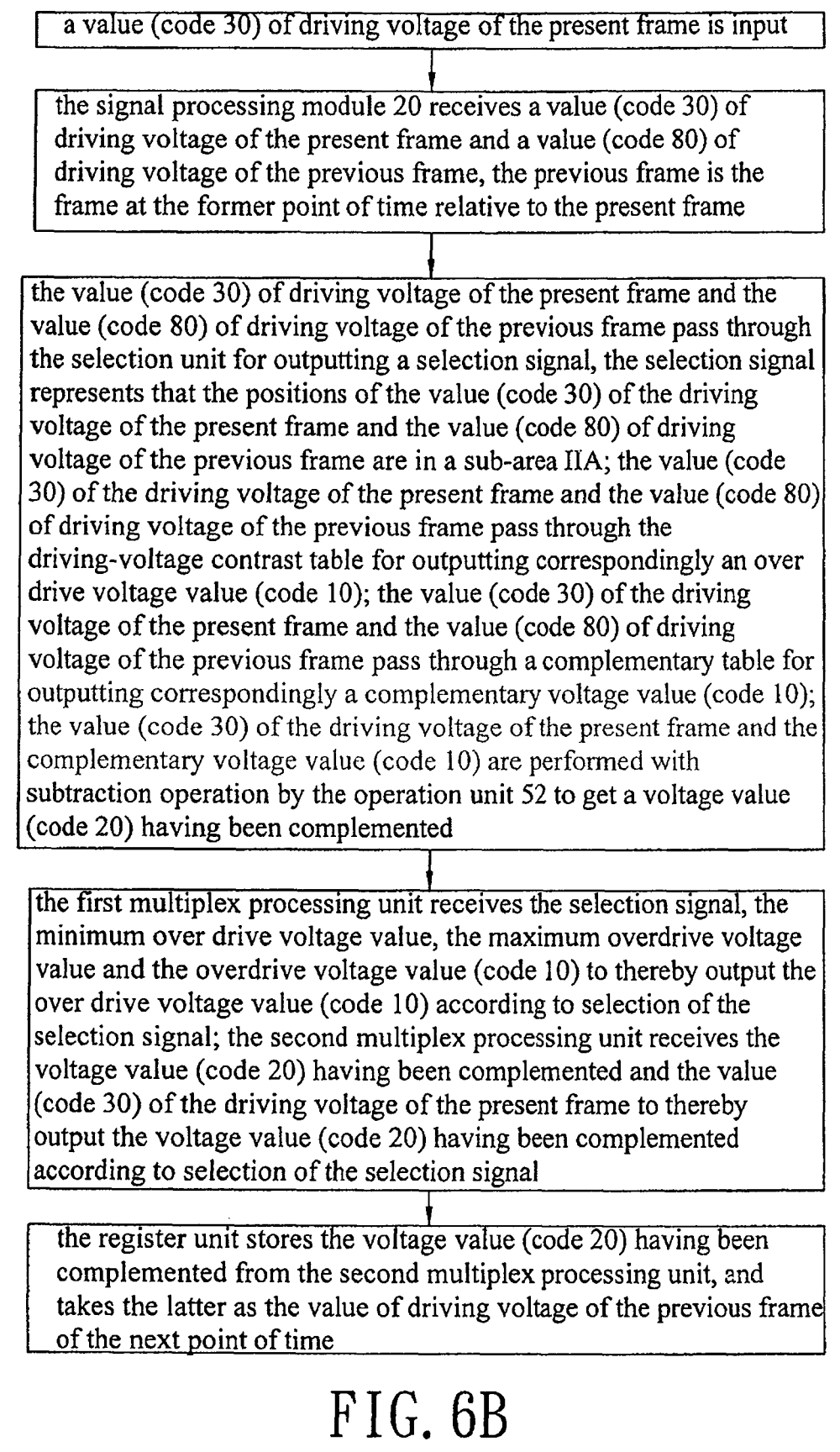

↓ the signal processing module 20 receives a value (code 30) of driving voltage of the present frame and a value (code 80) of driving voltage of the previous frame, the previous frame is the frame at the former point of time relative to the present frame

↓ the value (code 30) of driving voltage of the present frame and the value (code 80) of driving voltage of the previous frame pass through the selection unit for outputting a selection signal, the selection signal represents that the positions of the value (code 30) of the driving voltage of the present frame and the value (code 80) of driving voltage of the previous frame are in a sub-area IIA; the value (code 30) of the driving voltage of the present frame and the value (code 80) of driving voltage of the previous frame pass through the driving-voltage contrast table for outputting correspondingly an over drive voltage value (code 10); the value (code 30) of the driving voltage of the present frame and the value (code 80) of driving voltage of the previous frame pass through a complementary table for outputting correspondingly a complementary voltage value (code 10); the value (code 30) of the driving voltage of the present frame and the complementary voltage value (code 10) are performed with subtraction operation by the operation unit 52 to get a voltage value (code 20) having been complemented

↓ the first multiplex processing unit receives the selection signal, the minimum over drive voltage value, the maximum overdrive voltage value and the overdrive voltage value (code 10) to thereby output the over drive voltage value (code 10) according to selection of the selection signal; the second multiplex processing unit receives the voltage value (code 20) having been complemented and the value (code 30) of the driving voltage of the present frame to thereby output the voltage value (code 20) having been complemented according to selection of the selection signal

↓ the register unit stores the voltage value (code 20) having been complemented from the second multiplex processing unit, and takes the latter as the value of driving voltage of the previous frame of the next point of time

FIG. 6B a value (code 20) of driving voltage of the present frame is input

Figure 6D:
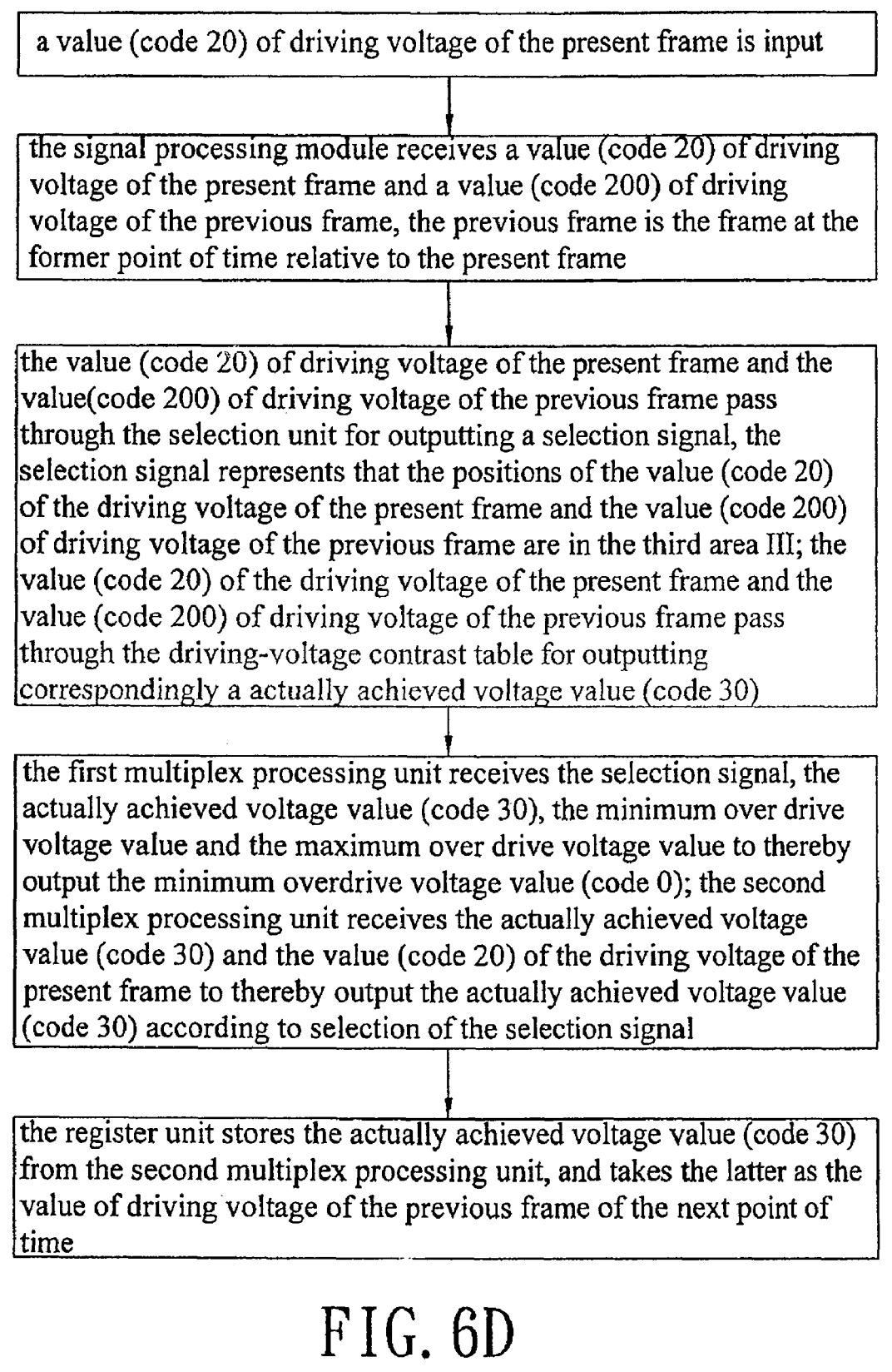

↓ the signal processing module receives a value (code 20) of driving voltage of the present frame and a value (code 200) of driving voltage of the previous frame, the previous frame is the frame at the former point of time relative to the present frame

↓ the value (code 20) of driving voltage of the present frame and the value(code 200) of driving voltage of the previous frame pass through the selection unit for outputting a selection signal, the selection signal represents that the positions of the value (code 20) of the driving voltage of the present frame and the value (code 200) of driving voltage of the previous frame are in the third area III; the value (code 20) of the driving voltage of the present frame and the value (code 200) of driving voltage of the previous frame pass through the driving-voltage contrast table for outputting correspondingly a actually achieved voltage value (code 30)

↓ the first multiplex processing unit receives the selection signal, the actually achieved voltage value (code 30), the minimum over drive voltage value and the maximum over drive voltage value to thereby output the minimum overdrive voltage value (code 0); the second multiplex processing unit receives the actually achieved voltage value (code 30) and the value (code 20) of the driving voltage of the present frame to thereby output the actually achieved voltage value (code 30) according to selection of the selection signal

↓ the register unit stores the actually achieved voltage value (code 30) from the second multiplex processing unit, and takes the latter as the value of driving voltage of the previous frame of the next point of time

FIG. 6D a value (code 200) of driving voltage of the present frame is input

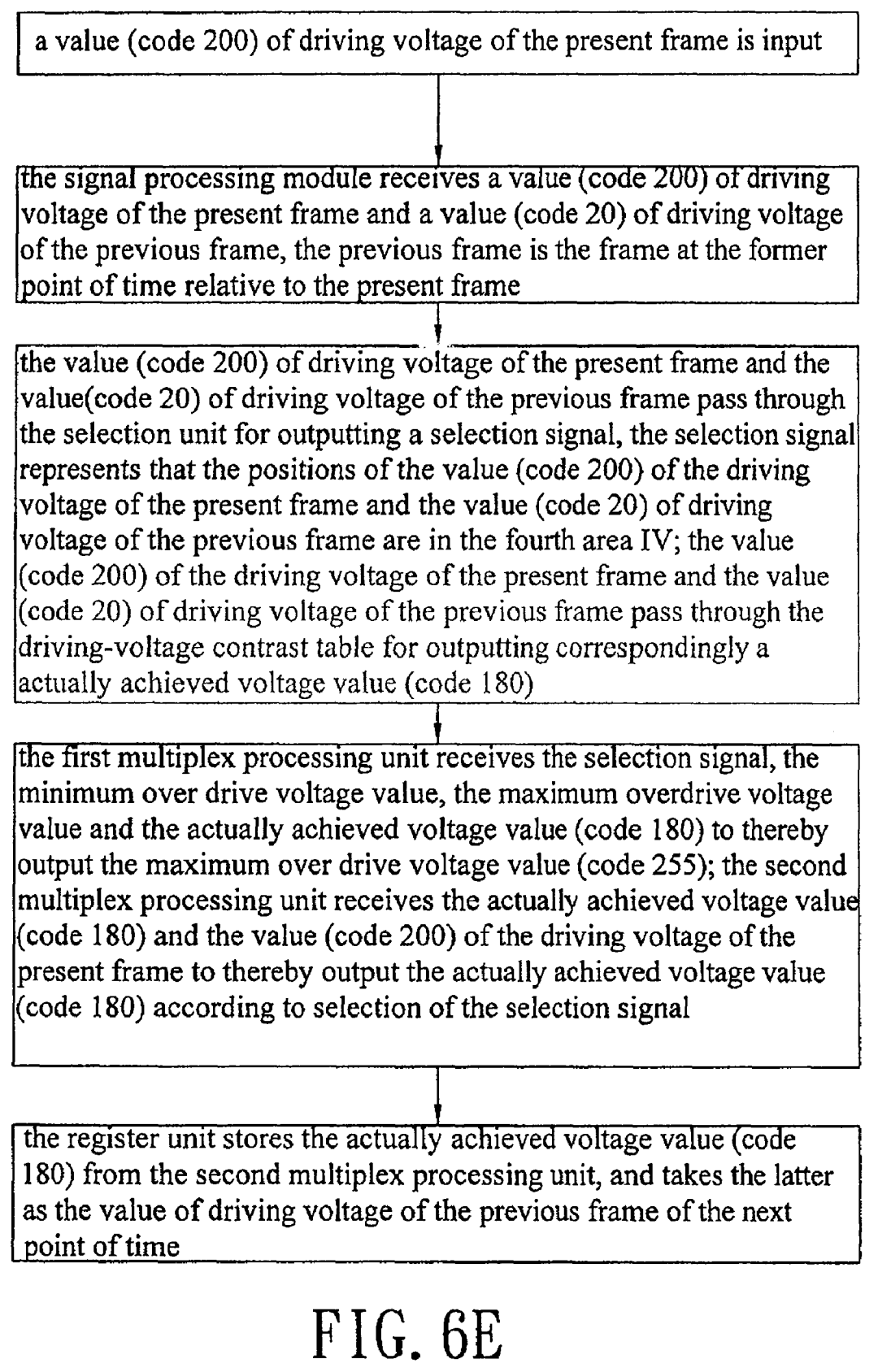

↓ the signal processing module receives a value (code 200) of driving voltage of the present frame and a value (code 20) of driving voltage of the previous frame, the previous frame is the frame at the former point of time relative to the present frame

↓ the value (code 200) of driving voltage of the present frame and the value(code 20) of driving voltage of the previous frame pass through the selection unit for outputting a selection signal, the selection signal represents that the positions of the value (code 200) of the driving voltage of the present frame and the value (code 20) of driving voltage of the previous frame are in the fourth area IV; the value (code 200) of the driving voltage of the present frame and the value (code 20) of driving voltage of the previous frame pass through the driving-voltage contrast table for outputting correspondingly a actually achieved voltage value (code 180)

↓ the first multiplex processing unit receives the selection signal, the minimum over drive voltage value, the maximum overdrive voltage value and the actually achieved voltage value (code 180) to thereby output the maximum over drive voltage value (code 255); the second multiplex processing unit receives the actually achieved voltage value (code 180) and the value (code 200) of the driving voltage of the present frame to thereby output the actually achieved voltage value (code 180) according to selection of the selection signal

↓ the register unit stores the actually achieved voltage value (code 180) from the second multiplex processing unit, and takes the latter as the value of driving voltage of the previous frame of the next point of time

FIG. 6E

OVERDRIVE METHOD FOR ANTI-DOUBLE EDGE OF LCD

CROSS-REFERENCE TO RELATED DOCUMENTS

The present invention is a continuation in part (CIP) to a U.S. patent application Ser. No. 11/014,841 entitled "Overdrive method for Anti-Double Edge" filed on Dec. 20, 2004 now abandoned.

BACKGROUND OF THE INVENTION

1. Field of the Invention

The present invention is related to an overdrive method for anti-double edge of LCD, and especially to an overdrive method which can effectively eliminate double edge phenomenon generated during overdrive liquid-crystal image developing by selection from an ADE (anti-double edge) Lookup Table (LUT) containing therein driving-voltage values of a present frame and a previous frame, overdrive voltage values and actually achieved voltage values. By adding a complementary table and an operation unit, the method can eliminate double edge phenomenon generated because of different response speeds; and thereby is suitable for various liquid crystal displays.

2. Description of the Prior Art

The liquid crystal display device allows obtaining a highly precise display. However, since the LCD does not have a sufficient image quality in displaying a moving pictures, so that there is an index-response time to discriminate being rood or bad of the performance of a liquid crystal display. Generally, liquid crystal displays are divided into two kinds when being not added with voltage: Normally White (NW) mode, and Normally Black (NB) mode; wherein the Normally White mode means that a display panel has a transparent frame when being not added with voltage, that is a bright frame; the Normally Black mode means that a display panel has an obscure state when being not added with voltage, that is a black frame. Taking the Normally White mode as an example, the response time is divided into two parts:

(1) ascending response time: this is the twist time required for liquid crystal to make the brightness of a liquid crystal box of a liquid crystal display to change from 90% to 10%, and is called "$T_r$" under adding with voltage; and (2) descending response time: this is the restoring time required for the liquid crystal to make the brightness of the liquid crystal to change from 10% to 90%, and is called "$T_f$" when being not added with voltage.

Generally, when the speed of developing of pictures exceeds 25 pieces/sec., the eyes of a person will take the pictures changing fast as continuous pictures; while in modern family amusements, such as in playing a high-quality DVD movie, the speed of developing the fast moving pictures normally is larger than 60 frames/sec. In other words, the time interval of each frame is 1/60=16.67 ms; if the response time of a liquid crystal display is larger than the frame interval, it will induce traces of residual images or tabs to seriously affect the qualities of images observed. It should be viewed from the factors affecting the response time to know how to increase the speed of response. The following equations are respectively the calculating equations for the ascending response time $T_r$ and the descending response time $T_f$:

$$T_r = \frac{\gamma_1 d^2}{\Delta\varepsilon(V^2 - V_{th}^2)} \quad T_f = \frac{\gamma_1 d^2}{\Delta\varepsilon V_{th}^2}$$

Wherein $\gamma_1$: the viscosity coefficient of the liquid crystal;
V: the driving voltage of the liquid crystal box;
$\Delta\in$: the dielectric coefficient of the liquid crystal.

It can be known from the above statement that there are four ways to reduce the response time of the liquid crystal display: to lower the viscosity coefficient of the liquid crystal, to reduce gaps of the liquid crystal box, to increase the driving voltage and to increase the dielectric coefficient, wherein the technique to increase the driving voltage is called an "overdrive" technique frequently applied in the LCD industry, an increased voltage higher than original gray level voltage can be transferred by a liquid-crystal driver IC to a liquid crystal panel to increase the twist voltage of the liquid crystal for increasing response speeds of liquid crystal and improving a motion blur of LCD panel, and thereby the liquid crystal can twist and restore faster to rapidly get the brightness of the image data to be presented. Some conventional methods and devices for improving the display characteristics of a liquid crystal display panel aim at improvement in the response speed of liquid crystal to reach a predetermined transmission rate in a single frame period, such as ones described in U.S. Pat. Nos. 6,825,821 and 7,148,869.

U.S. Pat. No. 6,825,821 describes an over-driving method using a brief table to store the over-driving image data. The brief table only includes part of the over-driving image data for driving the pixels switched from one gray scale to another. When the driving circuit receives the image data from the input terminal, a processor is used to perform an interpolation operation to expand the brief table. Hence, an extra algorithm is needed in the conventional over-driving method.

The values of overdrive voltage are obtained by measuring optical reaction curves of pixels of a LCD panel switched from any gray scale value to other gray scale values within a frame period and generating a standard overdrive look-up table (OD-LUT) according to the reaction curves measured. As shown in FIG. 7, it is a chart to indicate how the values of OD-LUT with the OD target time are selected. In the conventional method, an OD target time is measured by finding an intersection point of OD target time and the 100% luminance of desired target code. Further, a driving code that takes response of liquid crystal to the target level after just 1 frame of 16.7 ms is searched; that is, the response curve driven by a desired overdrive voltage mostly close to the intersection point around the OD target time is searched. For example, if OD target time is 16.7 ms and the driving code is from 16 to 192, we can find the intersection point of the 16.7 ms line and the 100% luminance of driving code 192. FIG. 7 shows that the curve of driving code from 16 to 232 is close to the intersection point mostly. And the value of the OD-LUT is 232 for driving code from 16 to 192, and the overdrive voltage of driving code from 16 to 232 is determined for driving the driving code from 16 to 192. In cases of image data of 6 bits (64 gray-scale), the OD-LUT provided in accordance with the number of gray-scale of image data stores 4096 pieces of data for the combinations of 64 gray-scale of a current frame and 64 gray-scale of a previous frame. Such that the physical characteristic of liquid crystal response between two gray levels is obtained.

Up to now, the OD-LUT is usually code-by-code adjusted/produced manually with operator's gaze by eyes to find out the results equivalent to the human visual perception, or produced by an automatic system to recursively search the optimal OD-LUT according to the MPRT (moving picture response time) of LCD, such as a system having a pursuit/tracking camera, high speed/fixed camera or a fixed optical detectors. In cases of the size of desired OD-LUT is 6×6, the operator will manually adjust the overdrive value of LUT one by one. By observing the motion of desired patterns, the operator chooses the appropriate value which not only improves the dynamic image quality with least motion blur but also makes the moving edge with least side-effect. When the overdrive voltage value of a conventional overdrive technique is getting close to a maximum value (code 255) and a minimum value (code 0), it is unable to render a liquid crystal to twist smoothly within the time interval of a frame to get an object value; as is shown in FIG. 8, an overdrive voltage value is added within the time interval of a first frame in order to get an object value of the driving voltage of a present frame, however the actually achieved voltage value is inferior; then another overdrive voltage value is added within the time interval of a second frame in order to get an object value of the driving voltage of a present frame, but rather, the error of the first frame renders the actually achieved voltage value to exceed the object value. Such error renders the liquid crystal panel to get a situation of being much brighter or darker than the bottom color during displaying of the liquid crystal panel; such situation is called "Double Edge". However, even thought the overdrive is a well known method and be widely used in LCD-TV, there is still no efficient and systematic way to find out the optimal OD-LUT which can solve both the problems of double edges and motion blur for various LCD panel. In order to get rid of the phenomenon of Double Edge created by the nature of liquid crystal in the conventional overdrive technique, big manufacturers in the art has proposed several solving countermeasures presently. However, the solving measures known presently all use a lookup table having overdrive codes (voltage values) and a lookup table having actually achieved voltage values of liquid crystal to respectively execute access, and then to make comparison of frame data of a previous frame temporarily stored in a frame register with frame data of a present frame coming from an input source, thus an overdrive code can be obtained and output.

By virtue that these operations all need the two lookup tables, while a lookup table also means that it needs two times of resource space for a memory, this forms an extremely heavy burden for a display with an extremely limited resource space for the memory. For example, LCDs for television and PC monitor having 8-bit gray levels may need tables for three colors of RGB and polarity of even/odd respectively, and it needs 12 tables with $2^{12}$ entries. In the other hand, it is the common tendency in the art of liquid crystal panels to increase speeds of response; while at such faster speeds of response, corresponding contrast data are required for their double edge phenomenon.

In view of the above conventional defects to be solved for providing a new countermeasure to solve the phenomenon of Double Edge for singular response speeds and different response speeds only with an anti-double edge lookup table (ADE LUT), the inventor provides the present invention based on his practical professional experience of industry in academic studying, designing and improvements.

SUMMARY OF THE INVENTION

The primary objective of the present invention is to provide an overdrive method to effectively save the resources of hardware and to eliminate the double edge phenomenon generated during overdrive liquid-crystal image developing by selecting respectively among present frame driving-voltage values, overdrive voltage values and actually achieved voltage values input from a driving-voltage lookup table and by outputting driving-voltage values suitable for respective situations according to selection signals of selection units by a plurality of multiplex processing units.

The secondary objective of the present invention is to provide an overdrive method using a complementary table and an operation unit, the method can effectively save the resources of hardware and to eliminate the double edge phenomenon generated at different response speeds by selecting respectively among present frame driving-voltage values, overdrive voltage values and actually achieved voltage values input from a driving-voltage lookup table and by outputting driving-voltage values suitable for respective situations according to selection signals of a selection unit by a plurality of multiplex processing units.

Therefore, in order to achieve the above stated primary objective, the overdrive method for anti-double edge of LCD of the present invention comprises using: a register unit, a first multiplex processing unit, a second multiplex processing unit, and a signal processing module having a selection unit and a driving-voltage lookup table (ADE LUT). The two ordinate axes of the driving-voltage lookup table represent the values of driving voltages of the present frame and the values of driving voltages of a previous frame, wherein the horizontal axis indicates the values of driving voltages of the present frame and the numerical values are arranged low to high in a left-to-right orientation, and wherein the vertical axis indicates the values of driving voltages of the previous frame and the numerical values are arranged low to high in a up-to-down orientation. The driving-voltage lookup table has therein a first, a second, a third and a fourth area, they respectively contain part of the look-up table and are provided for the followings: the first area contains values of driving voltage of the present frame, the second area contains overdrive voltage values, and the third and the fourth areas contains actually achieved voltage values measured in advance. The actually achieved voltage values are obtained by measurement in a manner the same with the measurement of overdrive voltage in advance. As described above, the overdrive voltage values and actually achieved voltage values are measured code-by-code adjusted/produced manually between two gray levels with operator's gaze by eyes to find out the results equivalent to the human visual perception, or produced by an automatic system to recursively search the optimal overdrive voltage values or actually achieved voltage values according to the MPRT of LCD.

Further, the values of driving voltage of the first area are stored in the cells arranged on the diagonal line of the LUT, which correspond to the situation where the input driving voltage of the present and the previous frame are the same; the values of driving voltage of the third area are stored in the cells arranged in the lower left part of the LUT; the values of driving voltage of the fourth area are stored in the cells arranged in the upper right part of the LUT; the values of driving voltage of the second area are stored in the cells arranged along both sides of the diagonal line of the LUT besides the third and fourth areas.

The steps of processing include:

(1) a value of driving voltage of the present frame is input;

(2) the signal processing module receives a value of driving voltage of the previous frame and a value of driving voltage of the present frame, the previous frame is the frame just before the present frame in relation to point of time;

(3) the value of driving voltage of the present frame and the value of driving voltage of the previous frame mentioned above are under selection of the selection unit for outputting a selection signal, the selection signal represents one of the first to fourth areas, the value of driving voltage of the present frame and the value of driving voltage of the previous frame pass through the driving-voltage lookup table for outputting one of the value of driving voltage of the present frame, an overdrive voltage value and a actually achieved voltage value;

(4) the first multiplex processing unit receives the selection signal, the value of driving voltage of the present frame, the overdrive voltage value, the minimum overdrive voltage value and the maximum overdrive voltage value to thereby output one of the value of driving voltage of the present frame, the overdrive voltage value, the minimum overdrive voltage value and the maximum overdrive voltage value according to the selection signal; the second multiplex processing unit receives one of the selection signal, the value of driving voltage of the present frame, the overdrive voltage value and the actually achieved voltage value to thereby output one of the value of driving voltage of the present frame and the actually achieved voltage value according to selection of the selection signal; and (5) the register unit stores one of the value of driving voltage of the present frame and the actually achieved voltage value output from the second multiplex processing unit, and takes the output as the value of driving voltage of the previous frame of the next point of time to output to the signal processing module.

Thereby, to give one of the value of driving voltage of the present frame, the overdrive voltage value, the minimum overdrive voltage value and the maximum overdrive voltage value in pursuance of the requirement of the respectively one of different driving voltages of frames; the double edge phenomenon generated during liquid-crystal image developing can be effectively gotten rid of, so that a liquid crystal display can display in a fast and accurate mode.

And thereby, in order to achieve the above stated secondary objective, the overdrive anti-double edge method of the present invention comprises using: a complementary table and an operation unit; the value of driving voltage of the present frame and the value of driving voltage of the previous frame pass through the driving-voltage lookup table for outputting a voltage complementary value, the operation unit does operation with the voltage complementary value for the value of driving voltage of the present frame, then it obtains the voltage value having been complemented; the first multiplex processing unit receives the selection signal, the value of driving voltage of the present frame, the minimum overdrive voltage value and the maximum overdrive voltage value to thereby select to output one of the value of driving voltage of the present frame, the minimum overdrive voltage value and the maximum overdrive voltage value according to the selection signal; the second multiplex processing unit receives the selection signal, the value of driving voltage of the present frame, the voltage value having been complemented and the actually achieved voltage value to thereby select to output one of the value of driving voltage of the present frame and the actually achieved voltage value.

Accordingly, to give one of the value of driving voltage of the present frame, the overdrive voltage value, the minimum overdrive voltage value and the maximum overdrive voltage value in pursuance of the requirement of the respectively one of different driving voltages of frames, the double edge phenomenon generated at different response speeds can be effectively gotten rid of, so that a liquid crystal display can display in a fast and accurate mode.

The present invention will be apparent after reading the detailed description of the preferred embodiment thereof in reference to the accompanying drawings.

BRIEF DESCRIPTION OF THE DRAWINGS

FIG. 3A shows a step of a first case of the first embodiment of the present invention;

FIG. 3C shows a step of a third case of the first embodiment of the present invention;

FIG. 6A shows a step of a first case of the second embodiment of the present invention;

FIG. 6B shows a step of a second case of the second embodiment of the present invention;

FIG. 6D shows a step of a fourth case of the second embodiment of the present invention;

FIG. 6E shows a step of a fifth case of the second embodiment of the present invention.

DETAILED DESCRIPTION OF THE PREFERRED EMBODIMENT

Figure 1:
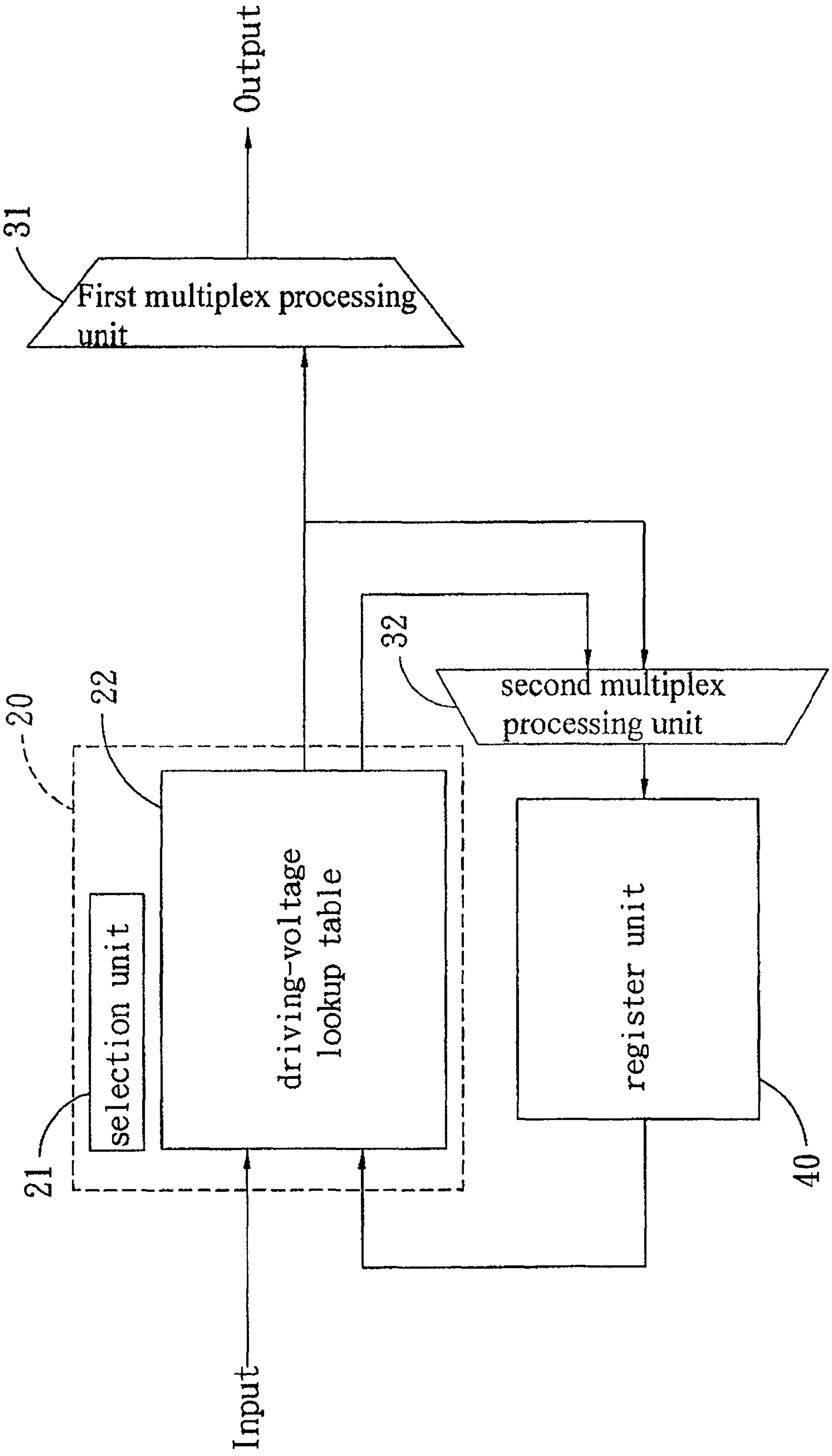
FIG. 1 is a schematic view showing the arrangement of a first embodiment of the present invention.

Referring to FIG. 1, the first embodiment of the overdrive method of the present invention is applied to a response speed of 16 ms, and includes using: a signal processing module 20 having a selection unit 21 and a driving-voltage lookup table (anti-double edge Lookup Table, namely, ADE LUT) 22, a first multiplex processing unit 31 and a second multiplex processing unit 32 to receive selection signals from the selection unit 21 and values of driving voltages from the driving-voltage lookup table 22, and a register unit 40.

Figure 2:
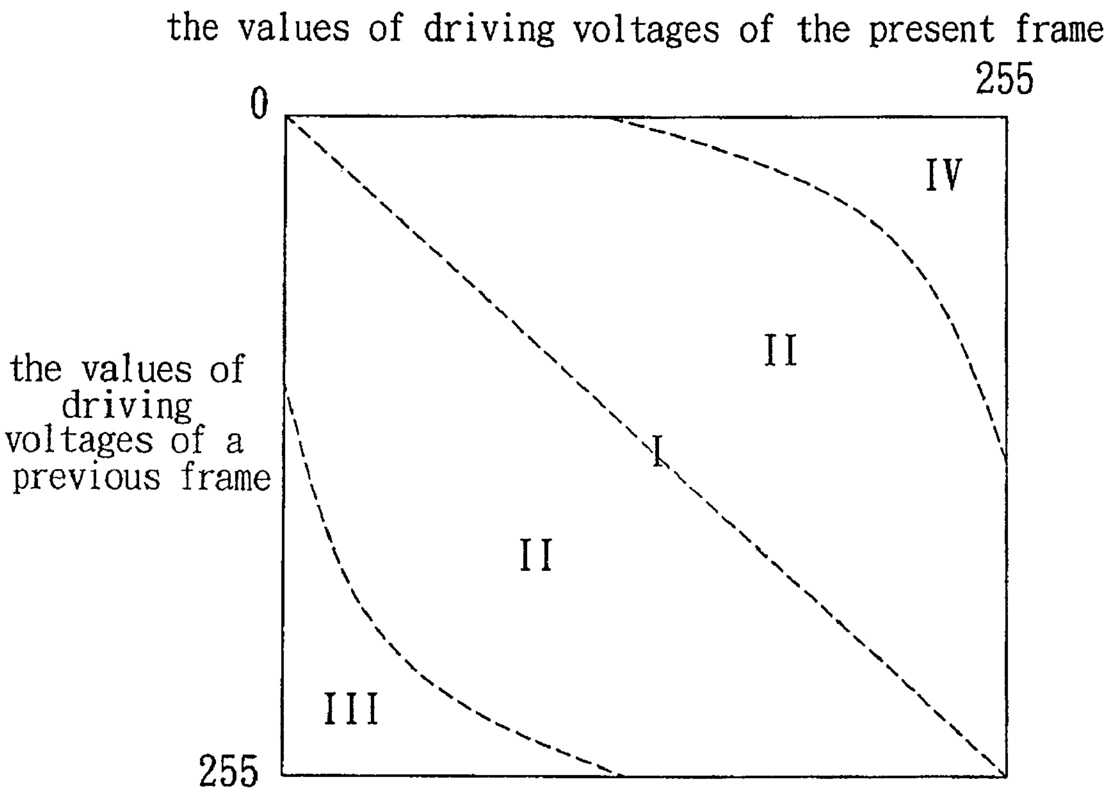
FIG. 2 depicts a curvilinear figure showing the allocating areas of a driving-voltage lookup table (ADE LUT) of the first embodiment of the present invention.
Figure 3B:
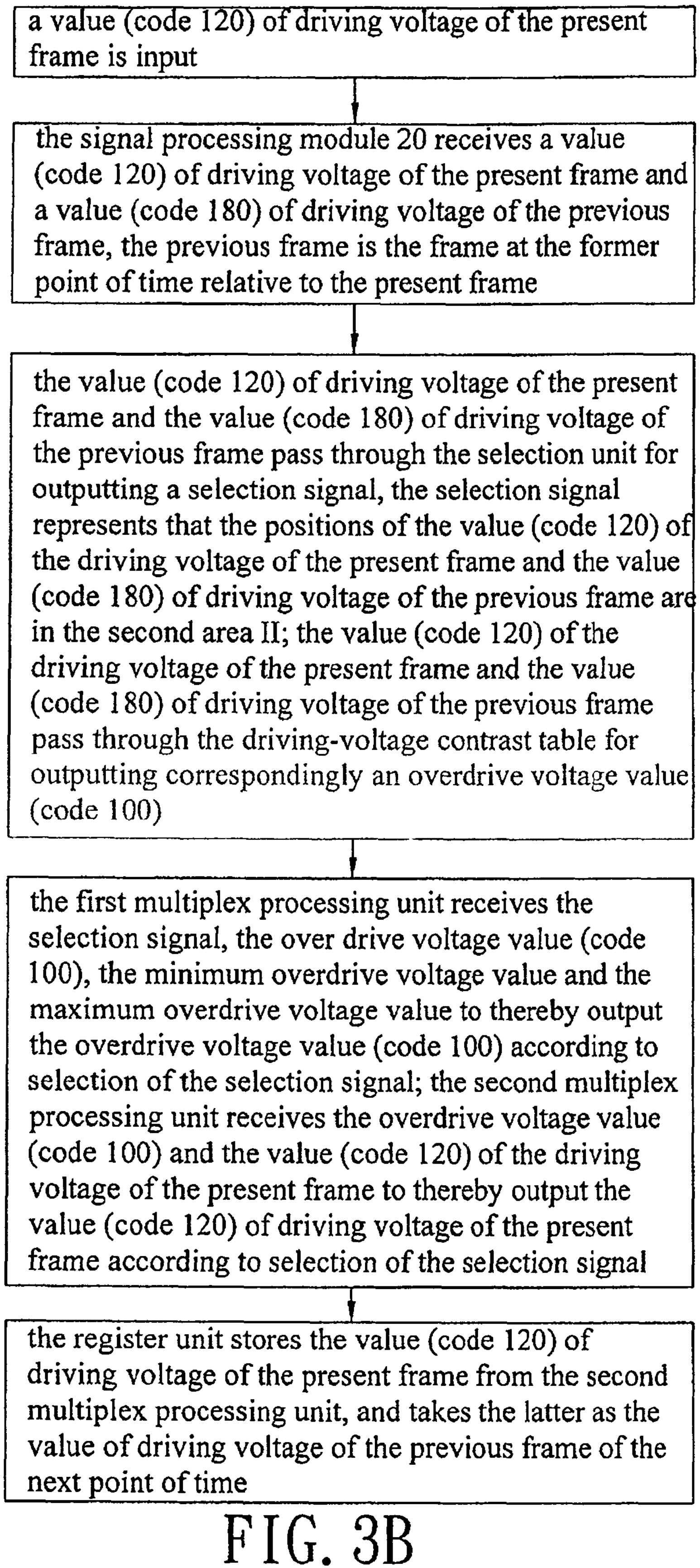
FIG. 3B shows a step of a second case of the first embodiment of the present invention.
Figure 3D:
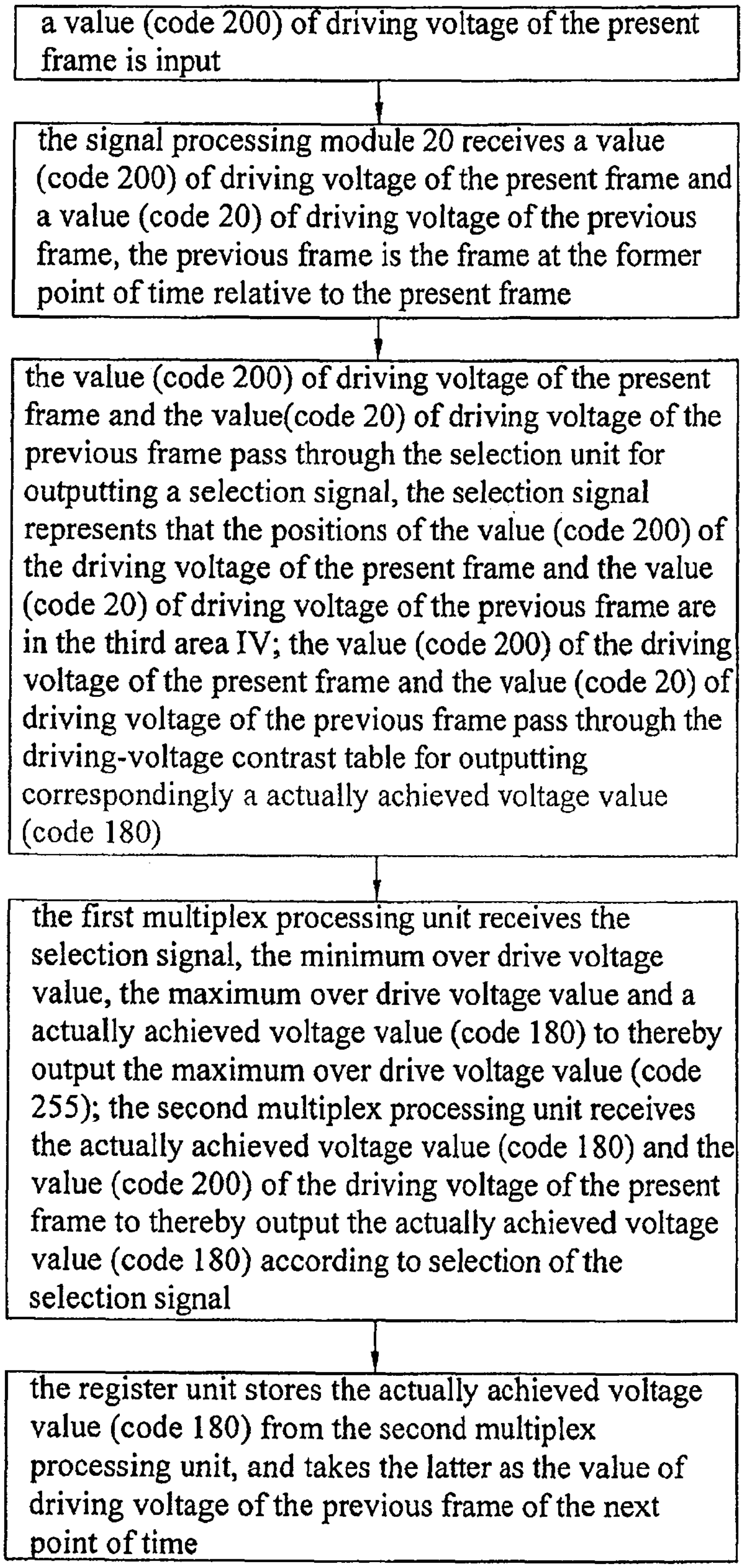
FIG. 3D shows a step of a fourth case of the first embodiment of the present invention.

As shown in FIG. 2, two ordinate axes of the driving-voltage lookup table 22 represent the values of driving voltages of the present frame and the values of driving voltages of a previous frame. The driving-voltage lookup table 22 has therein a first, a second, a third and a fourth area I, II, III, IV respectively for the values of driving voltages of a previous frame and the values of driving voltages of the present frame, the first area I contains the values of driving voltages of the present frame, the second area II contains overdrive voltage values, while the third and the fourth areas III, IV contain actually achieved voltage values.

The steps of processing of the overdrive method of the present invention include those shown in FIGS. 3A-3D, and include four cases:

The first case designates a code 120 (value) of driving voltage of a previous frame and a code 120 (value) of driving voltage of the present frame:

(1) the value (code 120) of driving voltage of the present frame and the value (code 120) of driving voltage of the previous frame pass through the selection unit 21 for outputting a selection signal, the selection signal represents that the positions of the value (code 120) of the driving voltage of the present frame and the value (code 120) of driving voltage of the previous frame are in the first area I; the value (code 120) of the driving voltage of the present frame and the value (code 120) of driving voltage of the previous frame pass through the driving-voltage lookup table 22 and directly output the value (code 120) of the driving voltage of the present frame;

(2) the first multiplex processing unit 31 receives the selection signal and the value (code 120) of the driving voltage of the present frame, and outputs the value (code 120) of the driving voltage of the present frame according to selection of the selection signal; the second multiplex processing unit 32 receives the value (code 120) of the driving voltage of the present frame, and outputs the value (code 120) of the driving voltage of the present frame to a register unit 40 according to selection of the selection signal.

The second case designates a value (code 180) of driving voltage of a previous frame and a value (code 120) of driving voltage of the present frame:

(1) a value (code 120) of driving voltage of the present frame is input;

(2) the signal processing module 20 receives a value (code 120) of driving voltage of the present frame and a value (code 180) of driving voltage of the previous frame, the previous frame is the frame at the former point of time relative to the present frame;

(3) the value (code 120) of driving voltage of the present frame and the value (code 180) of driving voltage of the previous frame pass through the selection unit 21 for outputting a selection signal, the selection signal represents that the positions of the value (code 120) of the driving voltage of the present frame and the value (code 180) of driving voltage of the previous frame are in the second area II; the value (code 120) of the driving voltage of the present frame and the value (code 180) of driving voltage of the previous frame pass through the driving-voltage lookup table 22 for outputting correspondingly an overdrive voltage value (code 100);

(4) the first multiplex processing unit 31 receives the selection signal, the overdrive voltage value (code 100), the minimum overdrive voltage value and the maximum overdrive voltage value to thereby output the overdrive voltage value (code 100) according to selection of the selection signal; the second multiplex processing unit 32 receives the overdrive voltage value (code 100) and the value (code 120) of the driving voltage of the present frame to thereby output the value (code 120) of driving voltage of the present frame according to selection of the selection signal; and (5) the register unit 40 stores the value (code 120) of driving voltage of the present frame from the second multiplex processing unit 32, and takes the latter as the value of driving voltage of the previous frame of the next point of time.

The third case designates a value (code 200) of driving voltage of a previous frame and a value (code 20) of driving voltage of the present frame:

(1) a value (code 20) of driving voltage of the present frame is input;

(2) the signal processing module 20 receives a value (code 20) of driving voltage of the present frame and a value (code 200) of driving voltage of the previous frame, the previous frame is the frame at the former point of time relative to the present frame;

(3) the value (code 20) of driving voltage of the present frame and the value (code 200) of driving voltage of the previous frame pass through the selection unit 21 for outputting a selection signal, the selection signal represents that the positions of the value (code 20) of the driving voltage of the present frame and the value (code 200) of driving voltage of the previous frame are in the third area III; the value (code 20) of the driving voltage of the present frame and the value (code 200) of driving voltage of the previous frame pass through the driving-voltage lookup table 22 for outputting correspondingly a actually achieved voltage value (code 30);

(4) the first multiplex processing unit 31 receives the selection signal, the minimum overdrive voltage value and the maximum overdrive voltage value to thereby output the minimum overdrive voltage value (code 0); the second multiplex processing unit 32 receives the actually achieved voltage value (code 30) and the value (code 20) of the driving voltage of the present frame to thereby output the actually achieved voltage value (code 30) according to selection of the selection signal;

(5) the register unit 40 stores the actually achieved voltage value (code 30) from the second multiplex processing unit 32, and takes the latter as the value of driving voltage of the previous frame of the next point of time.

The fourth case designates a value (code 20) of driving voltage of a previous frame and a value (code 200) of driving voltage of the present frame:

(1) a value (code 200) of driving voltage of the present frame is input;

(2) the signal processing module 20 receives a value (code 200) of driving voltage of the present frame and a value (code 20) of driving voltage of the previous frame, the previous frame is the frame at the former point of time relative to the present frame;

(3) the value (code 200) of driving voltage of the present frame and the value (code 20) of driving voltage of the previous frame pass through the selection unit 21 for outputting a selection signal, the selection signal represents that the positions of the value (code 200) of the driving voltage of the present frame and the value (code 20) of driving voltage of the previous frame are in the third area IV; the value (code 200) of the driving voltage of the present frame and the value (code 20) of driving voltage of the previous frame pass through the driving-voltage lookup table 22 for outputting correspondingly a actually achieved voltage value (code 180);

(4) the first multiplex processing unit 31 receives the selection signal, the minimum overdrive voltage value, the maximum overdrive voltage value and a actually achieved voltage value (code 180) to thereby output the maximum overdrive voltage value (code 255); the second multiplex processing unit 32 receives the actually achieved (code 180) and the value (code 200) of the driving voltage of the present frame to thereby output the actually achieved voltage value (code 180) according to selection of the selection signal;

(5) the register unit 40 stores the actually achieved voltage value (code 180) from the second multiplex processing unit 32, and takes the latter as the value of driving voltage of the previous frame of the next point of time.

Thereby, to give one of the value of driving voltage of the present frame, the overdrive voltage value, the minimum overdrive voltage value and the maximum overdrive voltage value in pursuance of the requirement of the respectively one of different driving voltages of frames, a liquid crystal display can thus display in a fast and accurate mode.

Figure 4:
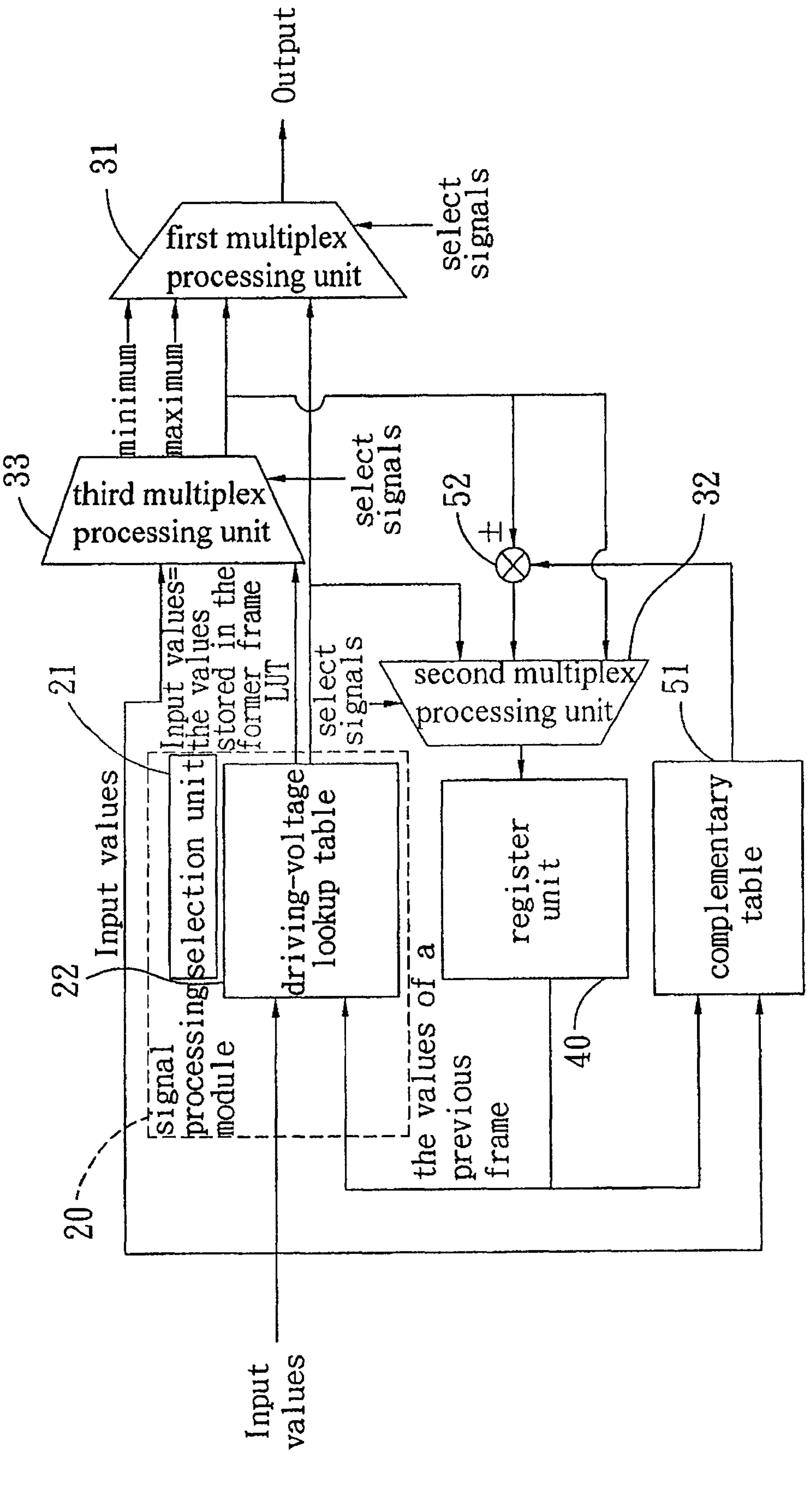
FIG. 4 is a schematic view showing the arrangement of a second embodiment of the present invention.

Referring to FIG. 4, the second embodiment of the overdrive method of the present invention is applied to a response speed of 8 ms, and includes using: a signal processing module 20 having a selection unit 21 and a driving-voltage lookup table (anti-double edge Lookup Table, namely, ADE LUT) 22, a first multiplex processing unit 31 and a second multiplex processing unit 32 to receive selection signals from the selection unit 21 and values of driving voltages from the driving-voltage lookup table 22, a register unit 40, a complementary table 51, an operation unit 52 and a third multiplex processing unit 33. The values of driving voltages of the present frame are data of 8 bits, the driving-voltage lookup table 22 stores data of 6 bits.

Figure 5:
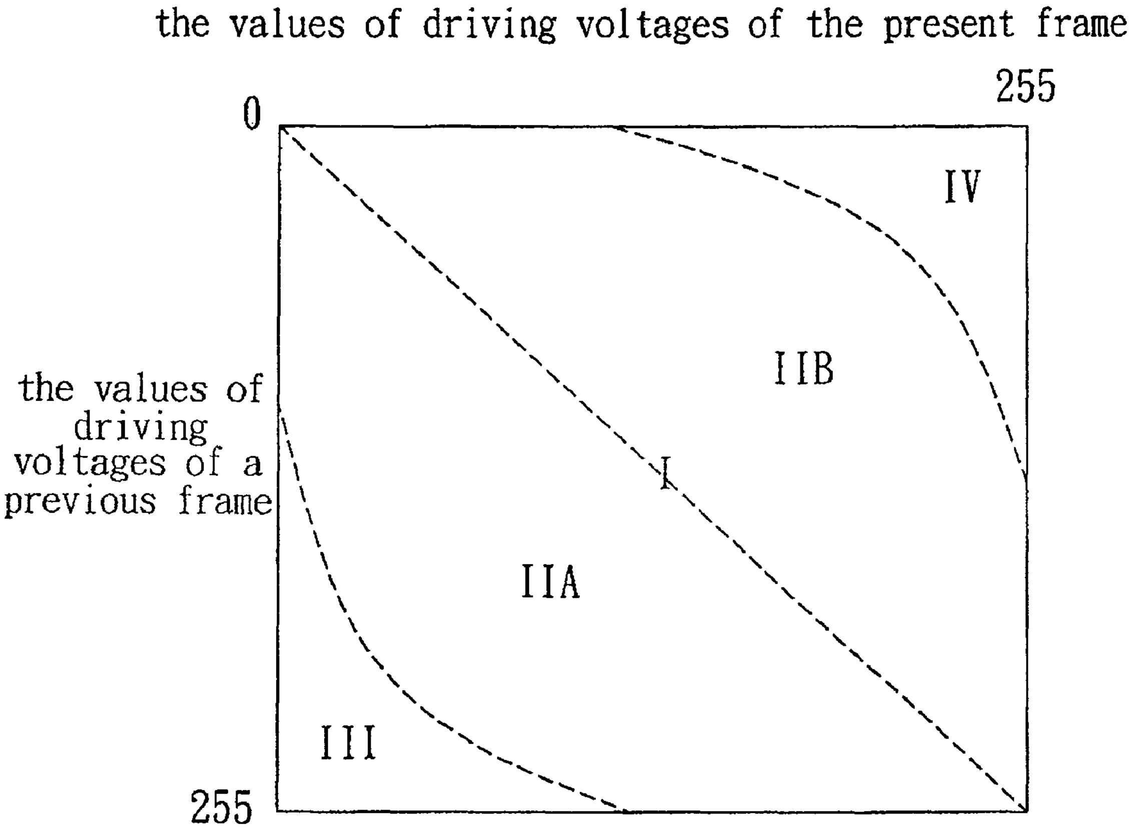
FIG. 5 depicts a curvilinear figure showing the allocating areas of a driving-voltage lookup table (ADE LUT) of the second embodiment of the present invention.
Figure 6C:
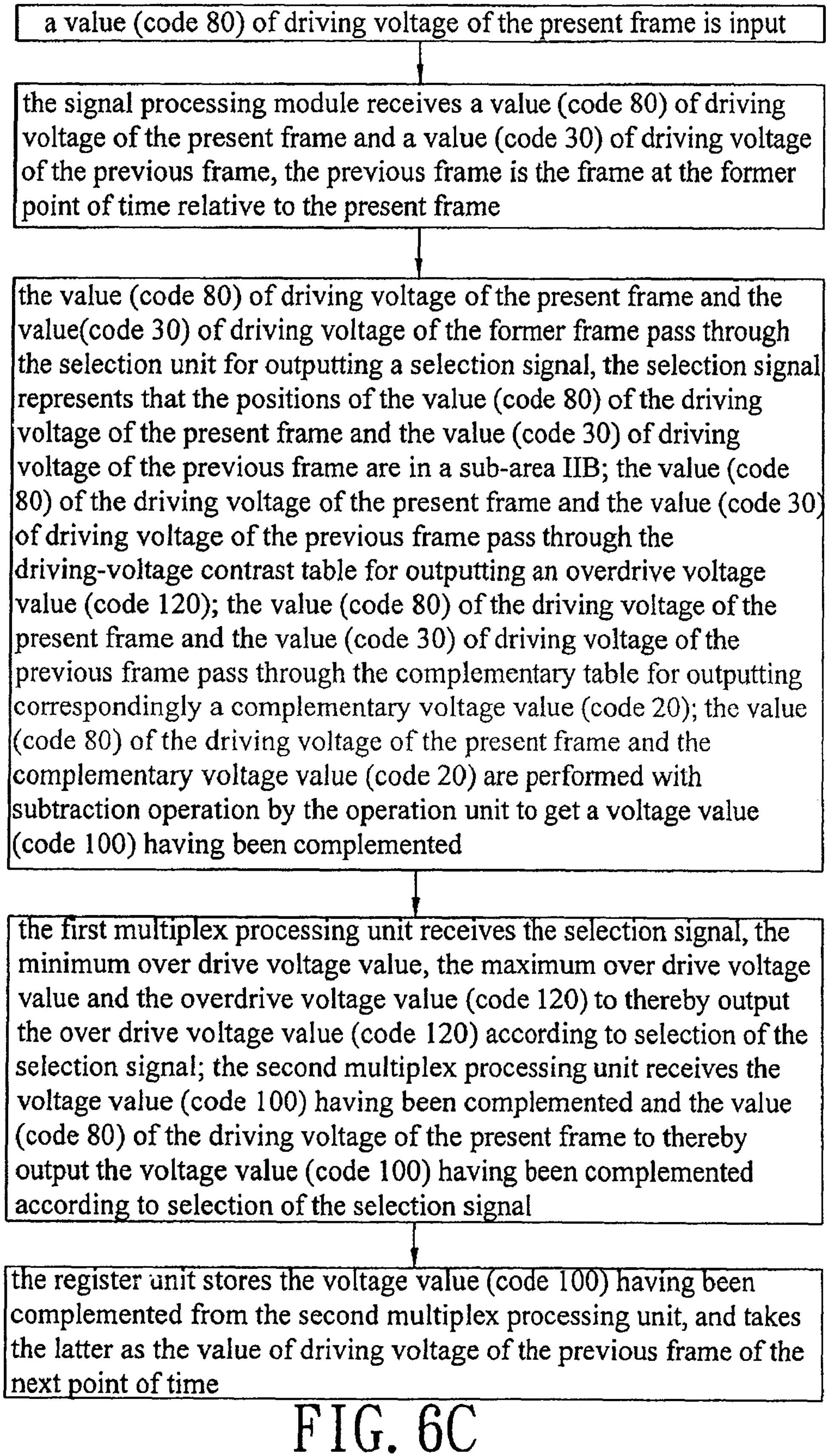
FIG. 6C shows a step of a third case of the second embodiment of the present invention.
Figure 7:
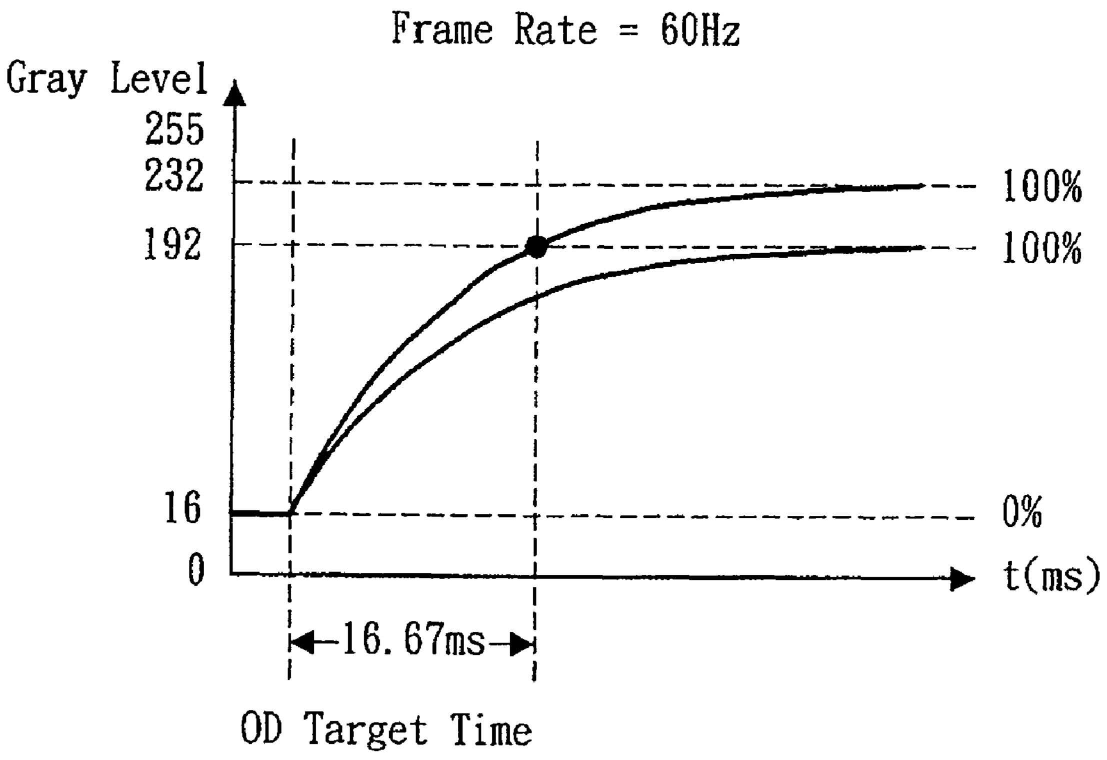
FIG. 7 is a schematic view showing the conventional method of determining an overdrive value.
Figure 8:
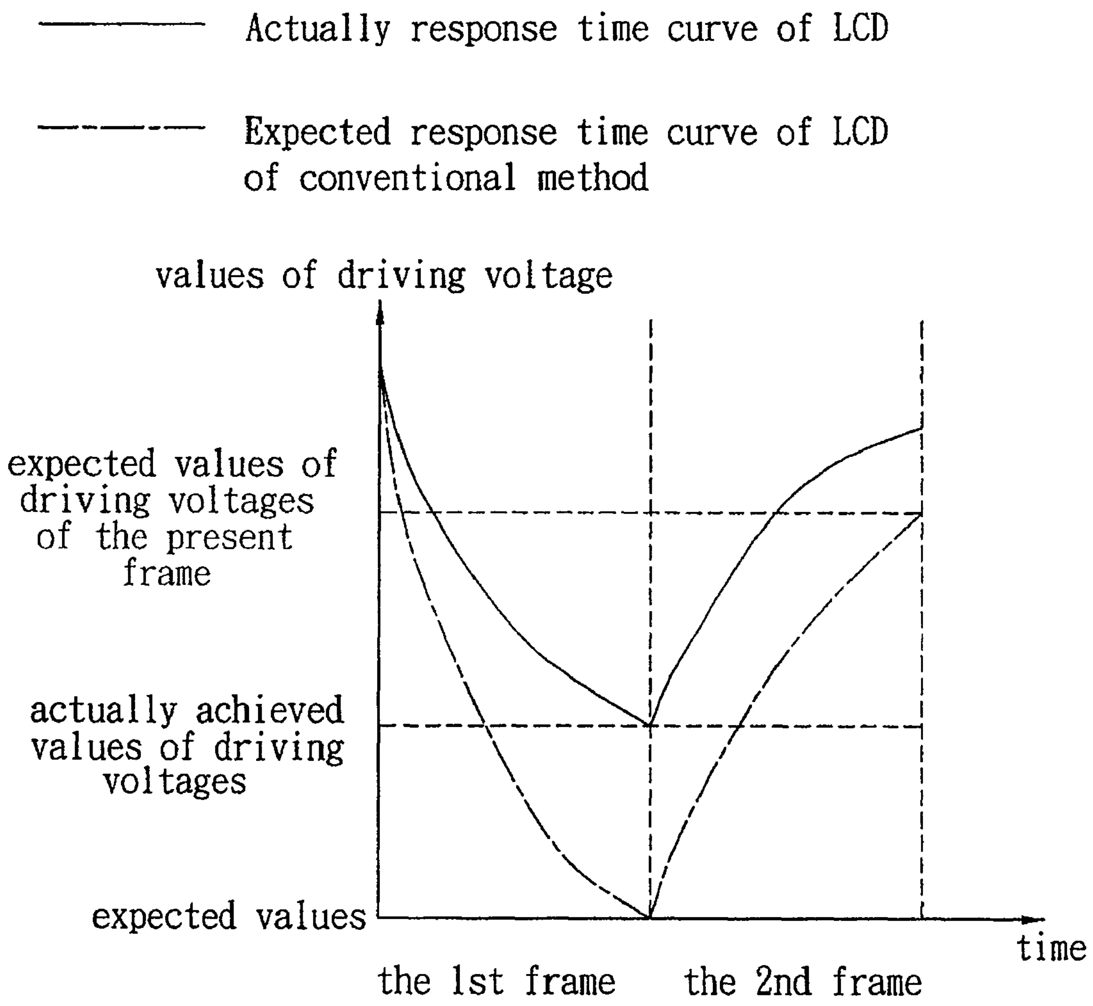
FIG. 8 is a schematic view showing the double edge phenomenon of the conventional overdrive technique.

As shown in FIG. 5, two ordinate axes of the driving-voltage lookup table 22 represent the values of driving voltages of a previous frame and the values of driving voltages of the present frame. The driving-voltage lookup table 22 has therein a first, a second, a third and a fourth area I, II, III, IV respectively for the values of driving voltages of a previous frame and the values of driving voltages of the present frame; wherein the second area II is divided into two sub-areas IIA, IIB, the first area I contains the values of driving voltages of the present frame, the sub-areas IIA, IIB of the second area II contains overdrive voltage values having been complemented, while the third and the fourth areas III, IV contain actually achieved voltage values.

The steps of processing of the overdrive method of the present invention can also include those shown in FIGS. 6A-E, and include five cases:

The first case designates a code 120 (value) of driving voltage of a previous frame and a code 120 (value) of driving voltage of the present frame:

(1) the value (code 120) of driving voltage of the present frame and the value (code 120) of driving voltage of the previous frame pass through the selection unit 21 for outputting a selection signal, the selection signal represents that the positions of the value (code 120) of the driving voltage of the present frame and the value (code 120) of driving voltage of the previous frame are in the first area I; the value (code 120) of the driving voltage of the present frame and the value (code 120) of driving voltage of the previous frame pass through the driving-voltage lookup table 22 and directly output the value (code 120) of the driving voltage of the present frame of 6 bits;

(2) the third multiplex processing unit 33 receives the selection signal and the value (code 120) of the driving voltage of the present frame of 8 bits output by a signal source 10, and outputs the value (code 120) of the driving voltage of the present frame of 8 bits according to selection of the selection signal;

(3) the first multiplex processing unit 31 receives the selection signal, the value (code 120) of the driving voltage of the present frame of 6 bits output by the driving-voltage lookup table 22 or the value (code 120) of the driving voltage of the present frame of 8 bits output by the third multiplex processing unit 33, and outputs the value (code 120) of the driving voltage of the present frame of 6 bits or of 8 bits according to selection of the selection signal; the second multiplex processing unit 32 receives the value (code 120) of the driving voltage of the present frame, and outputs the value (code 120) of the driving voltage of the present frame to a register unit 40 according to selection of the selection signal.

The second case designates a value (code 80) of driving voltage of a previous frame and a value (code 30) of driving voltage of the present frame:

(1) a value (code 30) of driving voltage of the present frame is input;

(2) the signal processing module 20 receives a value (code 30) of driving voltage of the present frame and a value (code 80) of driving voltage of the previous frame, the previous frame is the frame at the former point of time relative to the present frame;

(3) the value (code 30) of driving voltage of the present frame and the value (code 80) of driving voltage of the previous frame pass through the selection unit 21 for outputting a selection signal, the selection signal represents that the positions of the value (code 30) of the driving voltage of the present frame and the value (code 80) of driving voltage of the previous frame are in the sub-area IIA of the second area II; the value (code 30) of the driving voltage of the present frame and the value (code 80) of driving voltage of the previous frame pass through the driving-voltage lookup table 22 for outputting correspondingly an overdrive voltage value (code 10); the value (code 30) of the driving voltage of the present frame and the value (code 80) of driving voltage of the previous frame pass through the complementary table 51 for outputting correspondingly a complementary voltage value (code 10); the value (code 30) of the driving voltage of the present frame and the complementary voltage value (code 10) are performed with subtraction operation by the operation unit 52 to get a voltage value (code 20) having been complemented;

(4) the first multiplex processing unit 31 receives the selection signal, the minimum overdrive voltage value, the maximum overdrive voltage value and the overdrive voltage value (code 10) to thereby output the overdrive voltage value (code 10) according to selection of the selection signal; the second multiplex processing unit 32 receives the voltage value (code 20) having been complemented and the value (code 30) of the driving voltage of the present frame to thereby output the voltage value (code 20) having been complemented according to selection of the selection signal;

(5) the register unit 40 stores the voltage value (code 20) having been complemented from the second multiplex processing unit 32, and takes the latter as the value of driving voltage of the previous frame of the next point of time.

The third case designates a value (code 30) of driving voltage of a previous frame and a value (code 80) of driving voltage of the present frame:

(1) a value (code 80) of driving voltage of the present frame is input;

(2) the signal processing module 20 receives a value (code 80) of driving voltage of the present frame and a value (code 30) of driving voltage of the previous frame, the previous frame is the frame at the former point of time relative to the present frame;

(3) the value (code 80) of driving voltage of the present frame and the value (code 30) of driving voltage of the previous frame pass through the selection unit 21 for outputting a selection signal, the selection signal represents that the positions of the value (code 80) of the driving voltage of the present frame and the value (code 30) of driving voltage of the previous frame are in the sub-area IIB of the second area II; the value (code 80) of the driving voltage of the present frame and the value (code 30) of driving voltage of the previous frame pass through the driving-voltage lookup table 22 for outputting an overdrive voltage value (code 120); the value (code 80) of the driving voltage of the present frame and the value (code 30) of driving voltage of the previous frame pass through the complementary table 51 for outputting correspondingly a complementary voltage value (code 20); the value (code 80) of the driving voltage of the present frame and the complementary voltage value (code 20) are performed with subtraction operation by the operation unit 52 to get a voltage value (code 100) having been complemented;

(4) the first multiplex processing unit 31 receives the selection signal, the minimum overdrive voltage value, the maximum overdrive voltage value and the overdrive voltage value (code 120) to thereby output the overdrive voltage value (code 120) according to selection of the selection signal; the second multiplex processing unit 32 receives the voltage value (code 100) having been complemented and the value (code 80) of the driving voltage of the present frame to thereby output the voltage value (code 100) having been complemented according to selection of the selection signal;

(5) the register unit 40 stores the voltage value (code 100) having been complemented from the second multiplex processing unit 32, and takes the latter as the value of driving voltage of the previous frame of the next point of time.

The fourth case designates a value (code 200) of driving voltage of a previous frame and a value (code 20) of driving voltage of the present frame:

(1) a value (code 20) of driving voltage of the present frame is input;

(2) the signal processing module 20 receives a value (code 20) of driving voltage of the present frame and a value (code 200) of driving voltage of the previous frame, the previous frame is the frame at the former point of time relative to the present frame;

(3) the value (code 20) of driving voltage of the present frame and the value (code 200) of driving voltage of the previous frame pass through the selection unit 21 for outputting a selection signal, the selection signal represents that the positions of the value (code 20) of the driving voltage of the present frame and the value (code 200) of driving voltage of the previous frame are in the third area III; the value (code 20) of the driving voltage of the present frame and the value (code 200) of driving voltage of the previous frame pass through the driving-voltage lookup table 22 for outputting correspondingly a actually achieved voltage value (code 30);

(4) the first multiplex processing unit 31 receives the selection signal, the actually achieved voltage value (code 30), the minimum overdrive voltage value and the maximum overdrive voltage value to thereby output the minimum overdrive voltage value (code 0); the second multiplex processing unit 32 receives the actually achieved voltage value (code 30) and the value (code 20) of the driving voltage of the present frame to thereby output the actually achieved voltage value (code 30) according to selection of the selection signal;

(5) the register unit 40 stores the actually achieved voltage value (code 30) from the second multiplex processing unit 32, and takes the latter as the value of driving voltage of the previous frame of the next point of time.

The fifth case designates a value (code 20) of driving voltage of a previous frame and a value (code 200) of driving voltage of the present frame:

(1) a value (code 200) of driving voltage of the present frame is input;

(2) the signal processing module 20 receives a value (code 200) of driving voltage of the present frame and a value (code 20) of driving voltage of the previous frame, the previous frame is the frame at the former point of time relative to the present frame;

(3) the value (code 200) of driving voltage of the present frame and the value (code 20) of driving voltage of the previous frame pass through the selection unit 21 for outputting a selection signal, the selection signal represents that the positions of the value (code 200) of the driving voltage of the present frame and the value (code 20) of driving voltage of the previous frame are in the fourth area IV; the value (code 200) of the driving voltage of the present frame and the value (code 20) of driving voltage of the previous frame pass through the driving-voltage lookup table 22 for outputting correspondingly a actually achieved voltage value (code 180);

(4) the first multiplex processing unit 31 receives the selection signal, the minimum overdrive voltage value, the maximum overdrive voltage value and the actually achieved voltage value (code 180) to thereby output the maximum overdrive voltage value (code 255); the second multiplex processing unit 32 receives the actually achieved voltage value (code 180) and the value (code 200) of the driving voltage of the present frame to thereby output the actually achieved voltage value (code 180) according to selection of the selection signal;

(5) the register unit 40 stores the actually achieved voltage value (code 180) from the second multiplex processing unit 32, and takes the latter as the value of driving voltage of the previous frame of the next point of time.

Thereby, to give one of the value of driving voltage of the present frame, the overdrive voltage value having been complemented, the minimum overdrive voltage value and the maximum overdrive voltage value in pursuance of the requirement of the respectively one of different driving voltages of frames, a liquid crystal display can thus display in a fast and accurate mode.

The present invention accordingly has the following advantages:

1. It surely can avoid generation of the "Double Edge" phenomenon during image developing: the present invention effectively eliminates the double edge phenomenon generated by liquid-crystal image developing by a plurality of multiplex processing units to select respectively among present frame driving-voltage values, overdrive voltage values and actually achieved voltage values input from a lookup table and to output driving-voltage values suitable for practical situations.

2. It can considerably reduces hardware resources: the present invention comprises using a signal processing module including a selection unit and a driving-voltage lookup table (anti-double edge lookup table, namely, ADE LUT); in comparison with the conventional method, the present invention needs only the storing space of one lookup table, the requirement for the resource of hardware is fewer than that of conventional method; this can largely save the resources of hardware and cost.

3. It outputs suitable values of driving voltage in pursuance of the requirements of different response speeds and different situations of liquid-crystal displaying: the present invention is added with a complementary table and an operation unit to give one of the value of driving voltage of a present frame, a voltage value having been complemented, a minimum overdrive voltage value and a maximum overdrive voltage value in pursuance of the requirements of different response speeds and different voltages, a liquid crystal display can display in a fast and accurate mode.

The above disclosed are only for illustrating partial embodiments of the present invention, and not for giving any limitation to the scope of the present invention. It will be apparent to those skilled in this art that various modifications or changes without departing from the spirit of this invention shall also fall within the scope of the appended claims.

In conclusion, according to the description disclosed above, the present invention surely can achieve the expected objectives thereof to provide an overdrive method to effectively save the resources of hardware and to eliminate the double edge phenomenon generated at different response speeds by selecting respectively among present frame driving-voltage values, overdrive voltage values and actually achieved voltage values input from a driving-voltage lookup table and by outputting driving-voltage values suitable for respective situations according to selection signals of a selection unit by a plurality of multiplex processing units. The overdrive method is added with a complementary table and an operation unit to meet the requirements of different response speeds. Having thus described the technical process of my invention having high industrial value,

What we claim as new and desire to be secured by Letters Patent of the United States are:

1. An overdrive method for anti-double edge of LCD, in which an output voltage is determined from a driving voltage of a present frame and a driving voltage of a previous frame using a driving-voltage lookup table of a signal processing module, wherein the driving-voltage lookup table stores data of "n" bits and has therein a first, a second, a third and a fourth area that respectively contains part of the driving-voltage lookup table, and the two ordinate axes of the driving-voltage lookup table represent values of driving voltages of the present frame and values of driving voltages of the previous frame, comprising the steps of:

(1) inputting a value of driving voltage of the present frame and a value of driving voltage of the previous frame, wherein the value of driving voltage of the present frame contains data of "m" bits, and the previous frame is a frame at a former point of time relative to the present frame;

(2) processing the value of driving voltage of the present frame and the value of driving voltage of the previous frame with the signal processing module;

(3) selecting one value of driving voltage in correspondence with the inputted value of driving voltage of the present frame and the inputted value of driving voltage of the previous frame in the driving-voltage lookup table, the selected value of driving voltage being one of the values of the inputted value of driving voltage of the present frame, an overdrive voltage value and an actually achieved voltage value of the driving-voltage lookup table, and outputting a selection signal by a selection unit of the signal processing module, the selection signal representing which area of the driving-voltage lookup table where of the driving-voltage lookup table where the selected value of driving voltage locates;

(4) transmitting the selection signal, the selected value of driving voltage, a minimum overdrive voltage value and a maximum overdrive voltage value to a first multiplex processing unit, the first multiplex processing unit outputting one of the values of the selected value of driving voltage, the minimum overdrive voltage value and the maximum overdrive voltage value according to the selection signal;

(5) accessing a complementary table for outputting a voltage complementary value in correspondence with the value of driving voltage of the present frame and the value of driving voltage of the previous frame, and obtaining a voltage value having been complemented from an operation unit by performing operation with the voltage complementary value for the value of driving voltage of the present frame;

(6) transmitting the selection signal, the value of driving voltage of the present frame, the voltage value having been complemented and the actually achieved voltage value to a second multiplex processing unit, the second multiplex processing unit selecting and outputting one of the value of driving voltage of the present frame, the voltage value having been complemented and the actually achieved voltage value to a register unit according to the selection signal; and (7) storing the selected value of driving voltage output from the second multiplex processing unit in the register unit, the register unit taking the stored voltage value as the value of a driving voltage of a previous frame for a frame next to the present frame and transmitting the selected value of driving voltage stored in the register unit to the signal processing module for the next frame;

thereby, to apply one of the values of driving voltage of the present frame, the overdrive voltage value, the minimum overdrive voltage value and the maximum overdrive voltage value in pursuance of the requirement of respectively one of different driving voltages of frames the LCD displays in a fast and accurate mode.

2. The overdrive method for anti-double edge of LCD as in claim 1, wherein: the first area contains values of driving voltages of the present frame, the second area contains overdrive voltage values, while the third and the fourth areas contain actually achieved voltage values.

3. The overdrive method for anti-double edge of LCD as in claim 1, wherein: the number "n" is smaller than or equals to the number "m".

4. The overdrive method for anti-double edge of LCD as in claim 1, wherein: the method further uses a third multiplex processing unit located between the signal processing module and the first multiplex processing unit; the third multiplex processing unit receives the selection signal input from the signal processing module and the driving voltage of the present frame input from a signal source, and outputs the value of driving voltage of the present frame directly to the first multiplex processing unit according to selection of the selection signal.

5. The overdrive method for anti-double edge of LCD as in claim 1, wherein: the multiplex processing units are multiplexers.

6. The overdrive method for anti-double edge of LCD as in claim 4, wherein: the multiplex processing units are multiplexers.

* * * * *